Patented Dec. 5, 1922.

1,437,697

UNITED STATES PATENT OFFICE.

CHARLES WEIZMANN, OF LONDON, ENGLAND.

FERMENTATION PROCESS FOR THE PRODUCTION OF ACETONE AND BUTYL ALCOHOL.

No Drawing.   Application filed May 1, 1918.  Serial No. 231,974.

*To all whom it may concern:*

Be it known that I, Doctor CHARLES WEIZMANN, a subject of the King of Great Britain and Ireland, and residing at 67 Addison Road, London, W. 14, England, have invented certain new and useful Improvements in Fermentation Processes for the Production of Acetone and Butyl Alcohol, of which the following is a specification.

This invention relates to the production of acetone and butyl alcohol by fermentation processes.

In U. S. Patent No. 1315585, the production of acetone and butyl alcohol by the bacteriological decomposition of starchy carbohydrates is described.

The object of this invention is to improve the working of the process above referred to when applied to certain natural substances rich in starch which are of a nutty character, e. g., chestnuts or horse-chestnuts. Although it is well known that natural substances of the character just referred to contain considerable quantities of starch, they also contain saponines which I find tend to cause violent frothing. This on large scale fermentations is liable to have very serious results.

The invention consists in producing acetone and butyl alcohol from natural substances of a nutty character by adding malt or the like to the mash and then fermenting by the processes of U. S. Patents Nos. 1315585 or 1329214.

The first of the patents referred to, namely, No. 1315585, refers to the fermentation of solutions or suspensions of natural substances rich in starch or of other carbohydrates mixed with such substances under aerobic or anaerobic conditions, by the use substantially in the manner described, of heat-resisting bacteria, which are found in soil and cereals, such as maize, rice, flax, etc., and which will convert the greater part of maize or other grain starch into acetone and butyl alcohol, and will also liquefy gelatine. The second of the patents, No. 1329214, refers to a process of producing acetone and butyl alcohol consisting in submitting a sterilized carbohydrate mash to the action of suitable moulds having a strong proteolytic action or their enzymes and fermenting the mash by the introduction of one or more bacteria of the amylobacter group.

By malt or the like I refer to a body which will convert starch into sugar, the resulting sugary solution being much less liable to froth than the original mash which is a starchy solution. Such a body is the mould aspergillus oryzae or the enzymes secreted by it. Thus the heat resisting bacteria employed in this application are such as defined above, which are found in soil and cereals such as maize, rice, flax and the like and the fermenting may take place either under aerobic or anaerobic conditions.

In carrying this invention into effect, I preferably shell the chestnuts, and then finely divide the kernels, and prepare a mash therefrom at a temperature ranging between 120° C. and 130° C. by heating in a closed vessel to a steam pressure corresponding to this temperature. A medium is thus obtained which, although more acid than the usual grain media, is capable of being fermented by the acetone organism, for example, that of Patent No. 1315585. The presence of saponines, however, tends to cause frothing of the mash to take place. This may be so violent that the mash is blown out of the vessel when the fermentation sets in vigorously.

I find that by an addition of a small quantity (from 5 to 6 per cent) of malt to the mash at a temperature of 60° C. to 70° C. the mass is thinned down to such an extent that the frothing is almost negligible when fermentation takes place. The mash containing the malt addition is inoculated, and the fermentation is found to proceed normally, so that practically all the starch is used up with the production of a mixture of butyl alcohol and acetone.

As one example of this process I take 400 parts of freshly peeled horse-chestnuts and boil them with water for an hour at a suitably regulated temperature of 120° C. The mash is then made up to a concentration of from 6% to 9% solid matter and cooled down to a temperature of 60° to 70° C. and from 25 to 40 parts of ground malt are added.

The mash is stirred up with the malt for 2 to 3 hours and then sterilized. After cooling to 37° the mixture is inoculated with 2% of inoculant.

Fermentation sets in after a short time and is completed after about 72 hours.

The fermented mash is then worked up in the usual way.

I have found that the nuts can thus be worked up without preliminary treatment to separate the starchy matter and that they may even be thus fermented without removal of the husks although in that case the fermentation is much slower.

It is preferred to employ horse-chestnuts as they are not edible.

Having now described my invention, what I claim as new and desire to secure by Letters Patent is:—

1. A process for producing acetone and butyl alcohol from natural material of a nutty character, consisting in preparing a mash of the aforesaid material in water, adding malt to the mash and then fermenting by the use of heat resisting bacteria which are found in soil and cereals, which will convert the greater part of maize and other grain starch into acetone and butyl alcohol and will also liquefy gelatine.

2. A process for producing acetone and butyl alcohol from natural material of a nutty character consisting in preparing a mash of the aforesaid material in water, adding malt to the mash and then fermenting the mash by the introduction of bacteria of the amylobacter group.

3. A process for producing acetone and butyl alcohol from natural material of a nutty character, consisting in preparing a mash of the aforesaid material in water, adding malt to the mash and then fermenting the mash after sterilizing and submitting the same to the action of bodies having a strong proteolytic action, the fermentation being effected by the introduction of bacteria of the amylobacter group.

4. A process for producing acetone and butyl alcohol from natural material of a nutty character, consisting in preparing a mash of the aforesaid material in water, adding malt to the mash and then fermenting by a fermenting organism together with aspergillus oryzae.

5. A process for producing acetone and butyl alcohol from natural material of a nutty character, consisting in preparing a mash of the aforesaid material in water, adding malt to the mash and then fermenting under aerobic conditions by the use of heat resisting bacteria which are found in soil and cereals, which will convert the greater part of maize and other grain starch into acetone and butyl alcohol and will also liquefy gelatine.

6. A process for producing acetone and butyl alcohol from natural material of a nutty character, consisting in preparing a mash of the aforesaid material in water, adding malt to the mash and then fermenting the mash by the introduction of a plurality of types of bacteria of the amylobacter group.

7. In a process for the production of acetone and butyl alcohol from natural material of a nutty character, the steps of preparing a mash of the aforesaid material in water and treating the mash with malt for the purpose of thinning the liquor and partially removing the saponines or rendering them less effective from the point of view of causing frothing.

In testimony whereof I have signed my name to this specification.

CHARLES WEIZMANN.